United States Patent [19]

Ganderton et al.

[11] Patent Number: 4,711,398

[45] Date of Patent: Dec. 8, 1987

[54] SPRAYING EQUIPMENT

[75] Inventors: Alfred D. Ganderton; William A. Brazier, both of Bromyard, England

[73] Assignee: E. Allman & Company Limited, West Sussex, England

[21] Appl. No.: 828,297

[22] Filed: Feb. 11, 1986

[30] Foreign Application Priority Data

Feb. 12, 1985 [GB] United Kingdom ............... 8503549
Mar. 4, 1985 [GB] United Kingdom ............... 8505507

[51] Int. Cl.⁴ ............................................. B05B 1/20
[52] U.S. Cl. .................................... 239/167; 428/218
[58] Field of Search .................... 428/36, 218, 73, 76; 239/159, 166, 167

[56] References Cited

U.S. PATENT DOCUMENTS

| | | | |
|---|---|---|---|
| 3,013,584 | 12/1961 | Reed et al. | 428/73 |
| 3,145,000 | 5/1963 | Mackie | 428/73 |
| 3,383,004 | 8/1965 | Closner | 428/73 |
| 3,972,476 | 8/1976 | Hall | 239/167 |
| 3,997,695 | 12/1976 | Gitt et al. | 428/377 |
| 4,039,147 | 8/1977 | Hugg | 239/167 |
| 4,052,523 | 10/1977 | Rhodes et al. | 428/73 |
| 4,086,378 | 4/1978 | Kam et al. | 428/73 |
| 4,288,034 | 9/1981 | Widmer et al. | 239/159 |
| 4,441,655 | 4/1984 | Blumhardt | 239/167 |
| 4,459,334 | 7/1984 | Blanpied et al. | 428/219 |
| 4,619,553 | 10/1986 | Fischer | 428/36 |

Primary Examiner—John E. Kittle
Assistant Examiner—James J. Seidleck
Attorney, Agent, or Firm—Costas, Montgomery & Dorman

[57] ABSTRACT

A boom for spraying equipment comprises at least one elongate member having an outer skin over a core of a material having a lower density than the skin. The core material may occupy all of the space within the outer skin or the elongate member may be hollow, at least part of a side wall of the member being formed of an outer skin, an inner skin and core material sandwiched between the inner and outer skins. The outer skin and the core material may be metallic or non-metallic, suitably a fibre reinforced plastics material. There may be a plurality of elongate members which are mutually spaced, parallel arranged and extend in a direction lengthwise of the boom.

21 Claims, 12 Drawing Figures

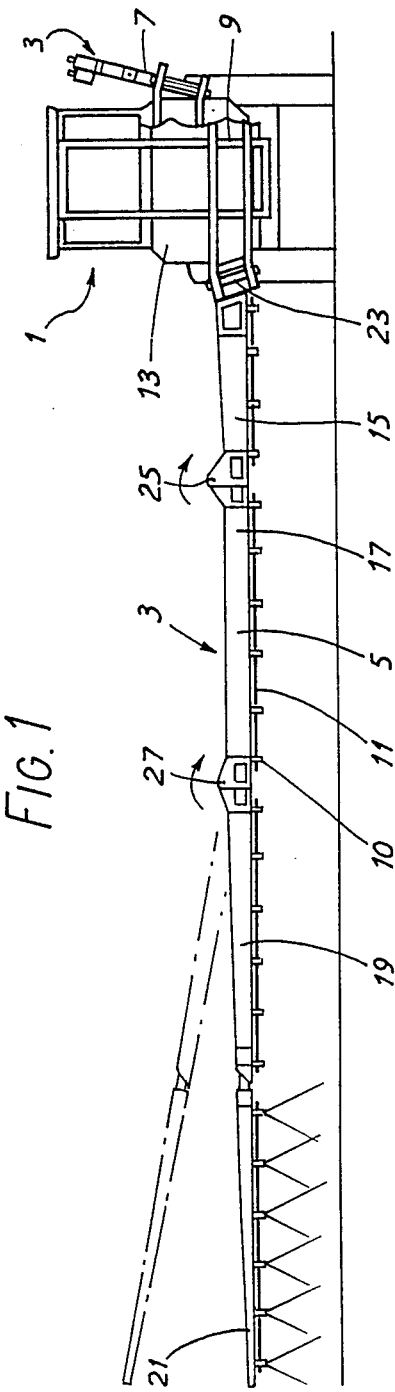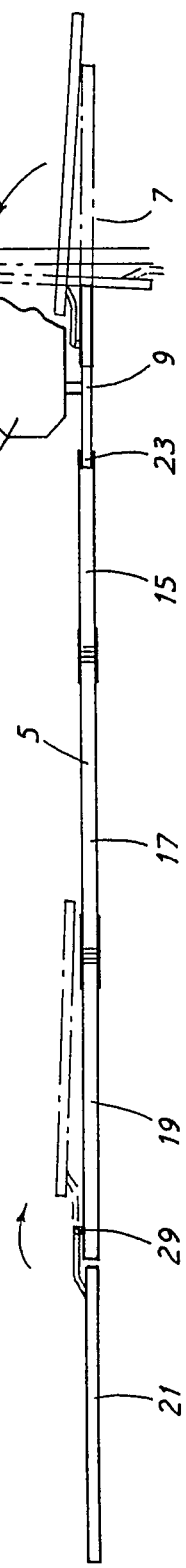

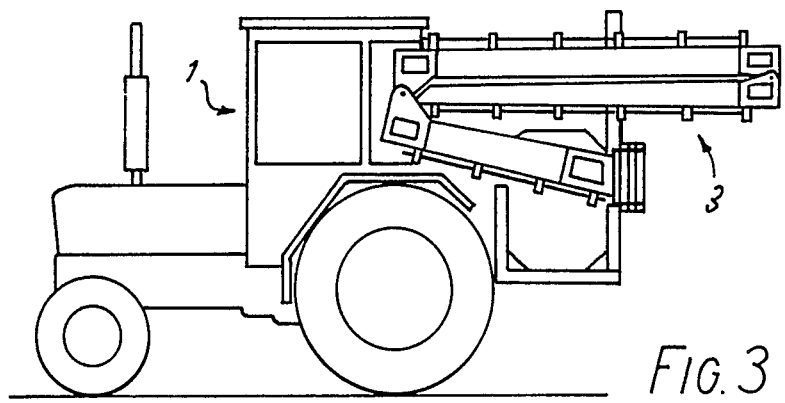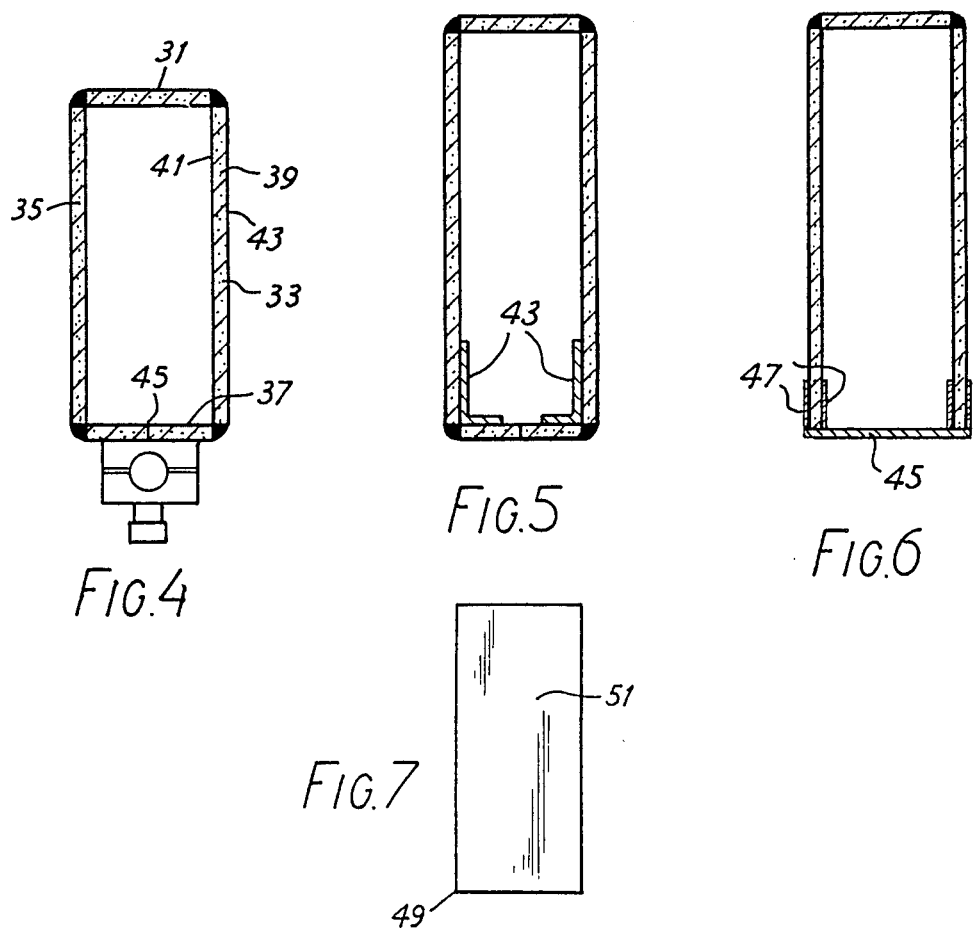

SPRAYING EQUIPMENT

FIELD OF THE INVENTION

This invention relates to booms for spraying equipment.

BACKGROUND OF THE INVENTION

To reduce the time spent in spraying crops by tractor-mounted or tractor-drawn equipment and to reduce the number of "tramlines" for the passage of tractor wheels, it is desirable to increase the area of a crop which is sprayed during each traverse of a field. Accordingly, recent years have seen an increase in the width of typical booms for agricultural or horticultural spraying equipment from twelve meters to twenty-four meters or even thirty six meters.

Unfortunately, increasing the length of a boom means increasing its weight, thereby increasing the load on the tractor and increasing the compaction of the land. There is therefore a need for a form of construction which results in a boom which is lighter per unit length than conventional booms whilst still having sufficient strength and rigidity.

Spraying equipment including similar booms may be tractor-drawn or mounted on a tractor, lorry, hovercraft, helicopter or even on a tricycle or bicycle and used for applying de-icing liquid to aircraft runways, similar large areas, or even roads. Spraying booms may also be mounted on ships or structures such as oil rigs, which may be floating or mounted on the sea-bed, and used for spraying chemicals to disperse oil slicks or other pollutants in the sea. In each of these cases there is also a need for a boom which is lighter per unit length than conventional booms whilst still being sufficently strong and rigid.

SUMMARY OF THE INVENTION

According to the present invention there is provided a boom for spraying equipment comprising a member having an outer skin over a material which has a lower density than the skin, the tensile and compressive strengths of the skin and the shear strength of the said material being sufficiently high for the boom to withstand tensile, compressive and shear forces to which it is subjected in use.

The material of lower density may occupy all or substantially all of the space within the outer skin.

Alternatively, the member may be hollow having a side wall at least part of which is formed of the said outer skin, an inner skin, and a core of the said material sandwiched between the inner and outer skins.

The member may be polygonal or circular in section.

Suitably, the hollow member is rectangular in section and has at least three sides thereof formed of a core of the said material sandwiched between outer and inner skins. If three sides are so formed, a fourth side is suitably formed of homogeneous material.

The said material may be of closed or open cell construction with cells of either regular or irregular nature.

The said material may be formed as a honeycomb of a metal, such as aluminium, or of a non-metal, such as a fibre reinforced plastics material, suitably a thermosetting resin. The said material may be made of a polyepoxide, polyurethane or a phenolic resin, with or without a thermoplastics material such as a polysulphone, reinforced with a woven or non woven fibrous sheet material such as glass cloth or aromatic polyamide paper. The cells in the honeycomb may be rectangular, square, sinusoidal, reinforced hexagonal, cylindrical, corrugated, hexagonal or spheroidal.

The outer skin or skins may be metallic, such as aluminium, aluminium alloy or stainless steel. Alternatively, the skin or skins are non-metallic, suitably a fibre reinforced plastics material, suitably a thermosetting resin and preferably a polyepoxide, polyurethane or phenolic resin, optionally containing a thermoplastics material such as a polysulphone. The fibre reinforcing material may be unidirectional, such as glass or carbon fibres, or it may be a cloth such as woven or non-woven glass, carbon or aromatic polyamide fibre. The outer skin or skins can include both metal and non-metallic material, for example, a perforated metal plate embedded in fibre-reinforced plastics material.

The member may be formed by a process which comprises forming a sheet having a honeycomb core, a first skin on one surface of the core, and a plurality of mutually spaced, generally parallel-arranged sections of a second skin on an opposite surface of the core, and then folding the sheet along a plurality of generally parallel lines, each fold line extending along the space between an adjacent pair of skin sections.

The spacing between adjacent skin sections is then such that the sections touch along the length of the fold therebetween.

Each adjacent pair of skin sections are preferably bonded together after folding. In the case of metal skins, bonding is effected by welding or brazing. In the case of non-metallic skins, bonding is effected by means of a thermosetting adhesive.

The boom may comprise a plurality of elongate members which are mutually spaced, parallel arranged and extend lengthwise of the boom, at least one of the members comprising the said outer skin over the said material of lower density.

Suitably, a boom according to the invention comprises a plurality of sections, each comprising at least one of the said elongate members, an innermost section of the boom being pivotally mounted on a supporting structure and each of the remaining sections being pivotally mounted at one end thereof on an adjacent section.

Preferably, the innermost section is pivoted for movement about a generally upright axis. Preferably, an outermost section is likewise pivoted for movement about a generally upright axis. The or each intermediate section is preferably pivoted for movement about a generally horizontal axis.

Preferably, the or each section is tapered in a direction outwardly of the boom.

Suitably, a plurality of spray nozzles, which may be electrostatic spray nozzles, are fitted to an underside of a boom according to the invention. A supply line for spraying liquid may likewise be fitted to the underside of the boom or, in the case of a hollow boom, the supply line may extend interiorly of the boom.

According to the present invention there is also provided a boom for spraying equipment comprising a hollow member having a side wall at least part of which is formed of a honeycomb core sandwiched between outer and inner skins.

The invention will now be described, by way of example, with reference to the accompanying drawings.

BRIEF DESCRIPTION OF THE DRAWINGS

FIG. 1 is a rear view of a tractor carrying a spraying boom according to the invention;

FIG. 2 is a plan view of the tractor and boom of FIG. 1;

FIG. 3 is a side view of the tractor and boom of FIG. 1, the boom being shown in the stowed position;

FIG. 4 is a transverse section of the boom shown in FIGS. 1 to 3;

FIGS. 5, 6 and 7 are transverse sections of alternative forms of construction for the boom of FIGS. 1 to 3;

FIGS. 1 and 2 are rear and plan views, respectively, of a tractor 1 carrying a spray boom 3 according to the invention.

DESCRIPTION OF PREFERRED EMBODIMENT

Figure 8A:
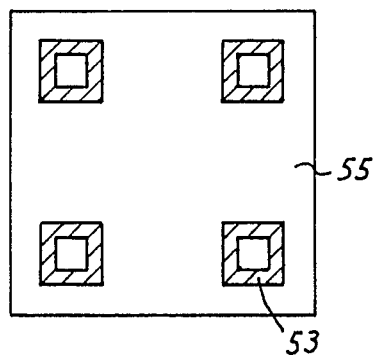
FIGS. 8A and B are a transverse section and a side elevation of part of a further boom acording to the invention.

As shown in these figures, the boom 3 has two arms 5 and 7, respectively, mounted on a support structure 9 at the rear of the tractor 1. Each of the arms 5 and 7 carries a series of spraying nozzles 10 which are connected via a spray line 11 to a tank 13 on the tractor. The arms 5 and 7 are 11 meters long and the structure 9 is 2 meters long, giving an overall boom length of 24 metres.

Each of the arms 5 and 7 is movable between an operative position, which is the position shown for the arm 5 in FIGS. 1 and 2, and a stowed position, which is the position shown for the arm 7. In the operative positions the arms 5 and 7 extend outwardly from respective opposite sides of the structure 9 whilst in the stowed position each arm is folded and adjacent the structure 9.

Referring again to FIGS. 1 and 2, each arm 5, 7 is made up of four boom sections, i.e., an inner section 15, two intermediate sections 17 and 19, respectively, and an outer section 21. The inner section 15 is pivotally connected to the structure 9 for movement about a generally upright axis 23, the intermediate section 17 is pivotal about a generally horizontal axis 25 relative to the section 15, the section 19 is pivotal about a generally horizontal axis 27 relative to the section 17, and the outer section 21 is pivotal about a generally upright axis 29 relative to the section 19.

Movement from the operative position to the stowed position is effected in four stages involving successive pivotal movements about axes 29, 27, 25 and 23, respectively. The location of the various beam sections in the stowed position is best shown in FIG. 3 of the drawings. Hydraulic rams for effecting the pivotal movements, not shown in the drawings, are controlled by controls on the tractor 1.

Referring now to FIG. 1, each of the sections 15, 17, 19 and 21 includes an elongate member which tapers in a direction of the boom and away from the tractor 1. Each member is rectangular in cross-section, having four sides 31, 33, 35 and 37. Each side is made of a material sold under the Registered Trade Mark Fibrelam and formed of a honeycomb core 39 sandwiched between an inner skin 41 and an outer skin 43. The core 39 has hexagonal cells made of resin-coated aramid and the skins 41 and 43 are unidirectional glass fibre/resin skins.

To manufacture the elongate members for the sections 15, 17, 19 and 21, four strips of a skin 431 are removed from a sheet of Fibrelam. The strips are mutually spaced and generally parallel arranged, allowing for the taper required over the length of a section. An epoxy adhesive is injected into the exposed honeycomb cells and the sheet is then folded through a right angle about the centre-line of each strip so that it assumes the rectangular shape shown in FIG. 4. The widths of each strip are such that the edge of the skin 41 on each of the sides 31, 33, 35 and 32 touches the edge of the skin 41 on an adjacent side at each corner of the rectangle. The side edges of the sheet, which then butt together on a line 45 along the side 37, are secured together by epoxy adhesive.

Alternatively, the skins may be produced by hand lay-up moulding, machine moulding, filament winding, or the fabrication of prefabricated sheets and sections by bonding or welding. Cores may be added by bonding in prefabricated sections or by formed-in-place materials.

FIG. 5 of the drawings shows a modified elongate member wherein aluminium extrusions 43 are provided along lower corners of a rectangular section for strengthening purposes.

In the modification shown in FIG. 6, three sides of an elongate member are made of Fibrelam and a bottom side 45 is formed of an aluminium plate. Along each side edge the plate is formed with a channel 47 into which a lower edge of one side of the member is fitted.

In the elongate member of FIG. 7 there is a single, outer skin 49 of rectangular section and a core material 51 which occupies all or substantially all of the space inside the skin 49.

Figure 8B:
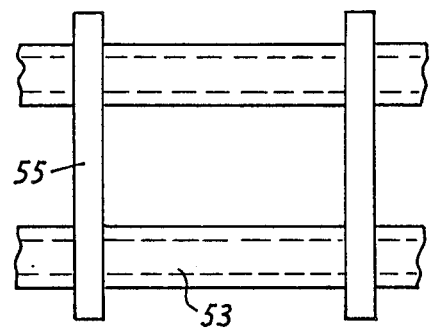

FIGS. 8A and 8B show part of a further boom sction having four mutually spaced, parallel arranged members 53, each extending lengthwise of the section. The members 53 are supported by bulkheads 55 at respective locations which, as viewed in FIG. 8A, form the four corners of a square or rectangle. Each member 53 has a rectangular section, with each side of the rectangle formed of a honeycomb core sandwiched between inner and outer skins.

It will be appreciated that the bulkheads 55 of FIGS. 8A and 8B may be made of a sandwich construction, having a core of low density material between the outer skins, or they may be formed of solid, homogeneous metal or non-metallic material. In modifications of the boom section of FIGS. 8A and 8B, one, two or three of the members 53 may have side walls made of solid, homogeneous metal or non-metallic material.

Figure 9A:
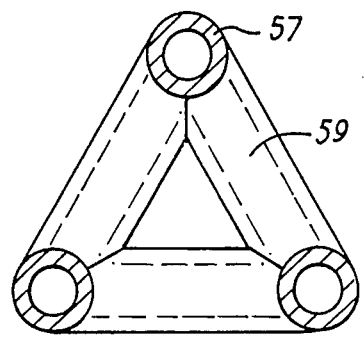
FIGS. 9A and B are a transverse section and a side elevation of part of a further boom according to the invention.
Figure 9B:
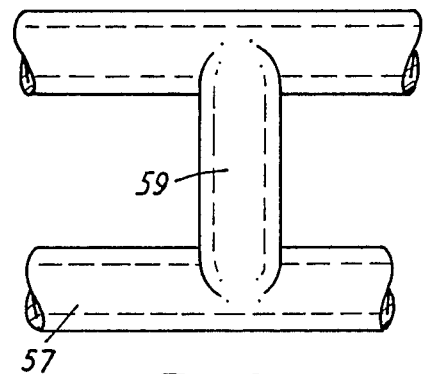

In the boom section of FIGS. 9A and 9B there are three elongate members 57 which, as viewed in FIG. 9A, occupy the three corners of an equilateral triangle. Support for the members 57 is provided by a series of cross-members 59, each of which extends between two of the members 57. Each cross-member 59 may be generally perpendicular to the axes of the associated members 57, as shown in FIG. 9B, or it may be inclined at an angle other than 90° to those members. The members 57 and the cross-members 59 are each circular in section and hollow, each having a side wall formed of a core material sandwiched between inner and outher skins.

The boom construction shown in FIGS. 9A and 9B can be varied by making the side walls of some or all of the cross-members 59 and one or two of the members 57 of solid, homogeneous metal or non-metallic material. It is particularly advantageous to use solid material for the side walls of the two lower members 57 and a sandwich construction for the uppermost member 57.

Figure 10:
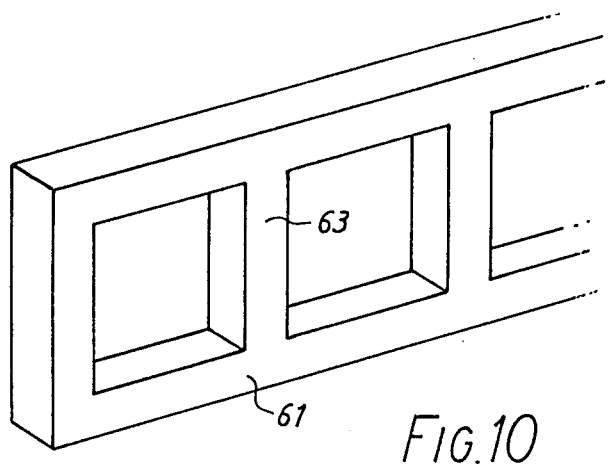
FIG. 10 is a perspective view of a part of a further boom according to the invention.

Referring now to FIG. 10, a further boom section according to the invention is constructed in the form of a lattice. The section has two elongate side members 61, which extend lengthwise of the section, and a series of cross-members 63, each of which extends perpendicularly of and between the members 61.

The members 61 and 63 of FIG. 10 are formed of a core material sandwiched between two outer skins. The section incorporating these members can be formed by cutting an appropriately shapped lattice from a sheet of core material and then covering the material with skins, either by hand or by machine lay-up and moulding.

In a modification of the boom section of FIG. 10 the cross-members 63 are inclined at an angle other than 90° to the elongate side members 61.

It will be appreciated each of the elongate boom members described above is a cantilever. This means that under normal usage, the top side 31 of the member is in tension, the underside 37 is in compression, and each of the sides 33 and 35 is subjected, at least along a mid-portion thereof, to high shearing forces. Upon impact with the ground or with an obstacle such as a tree, however, additional forces are applied to the boom and the forces of tension, compression and shear, and the directions in which these forces are applied, are changed.

In this connection, it will be appreciated that the or each skin in the booms described above has high tensile and compressive strength. The core material serves two main purposes. First, it prevents the skin or skins from buckling. Secondly, the material must enable each skin to act as the outer layer of a beam, which means it must possess shearing rigidity. In the result, the skin or skins serve to withstand most of the tensile and compressive forces to which the boom is subjected in use, whilst the core material assists the skin or skins in withstanding buckling forces and also offers a high resistance to shearing forces.

Booms according to the invention have a high degree of damping and inherent stiffness, which affords excellent fatigue characteristics as compared with previous spraying booms.

In place of a honeycomb core it is possible to use some other material which resists the shearing forces, possesses rigidity against deformation perpendicular to the plane of the (outer) skins and shearing rigidity in planes parallel to the outer skin. Examples of such a material are reticulated polyester foam, polyvinyl chloride foam, balsa wood, expanded metal or foamed metal.

It will be appreciated that the combination of a high density facing material and a lower density core material employed in booms according to the invention gives a much higher section modulus per unit density than materials conventionally used. For the same rigidity factor, a member having an aluminum skin on an aluminium honeycomb core has a weight which is 1/10th that of solid aluminium or 1/16th that of solid steel.

Having thus described the invention, what is claimed is:

1. A boom for spraying equipment comprising a support structure adapted for mounting on a movable vehicle, first and second arms pivotally mounted on the support structure for movement between an operative position, in which the arms extend generally horizontally outwardly on respective opposite sides of the structure, and a stowed position, each arm comprising at least one boom section in which there is an elongate member extending lengthwise of the section, a plurality of spray nozzles fitted to an underside of the boom along the length thereof, and a spray line for connecting a tank on the said vehicle to the spray nozzles, each elongate member having an outer skin over a material which has a lower density than the skin, and the tensile and compressive strengths of the skin and the shear strength of the said material are sufficiently high for the boom to withstand tensile, compressive and shear forces to which it is subjected in use.

2. A boom as claimed in claim 1, wherein the said material of lower density occupies all or substantially all of the space within the outer skin.

3. A boom as claimed in claim 1, wherein the member is hollow having a side wall at least part of which is formed of the said outer skin, an inner skin and a core of the said material sandwiched between the inner and outer skins.

4. A boom as claimed in claim 1, wherein the member is circular or polygonal in section.

5. A boom as claimed in claim 3, wherein the member is rectangular in section and has at least three sides thereof formed of a core of the said material sandwiched between inner and outer skins.

6. A boom as claimed in claim 5, wherein three sides of the member are formed of a core of the said material sandwiched between inner and outer skins and a fourth side is formed of homogeneous material.

7. A boom as claimed in claim 1, wherein the said material is of open cell construction.

8. A boom as claimed in claim 1, wherein the said material is formed as a honeycomb.

9. A boom as claimed in claim 1, wherein the said material is a metal or a fibre reinforced plastics material.

10. A boom as claimed in claim 1, wherein the or each skin is a metal or a fibre reinforced plastics material.

11. A boom as claimed in claim 1, wherein the or each skin comprises a metal embedded in fibre reinforced plastics material.

12. A boom as claimed in claim 1, comprising a plurality of members which are elongate, mutually spaced, parallel arranged and extend lengthwise of the boom, at least one of the members comprising the said outer skin over the said material of lower density.

13. A boom as claimed in claim 12, wherein the said elongate members are supported by a plurality of bulkheads which are spaced apart in a direction lengthwise of the boom.

14. A boom as claimed in claim 12, wherein the said elongate members are supported by a plurality of cross-members each inclined to the axes of the said elongate members.

15. A boom as claimed in claim 13, wherein the boom or each bulkhead or cross-member comprises an outer skin over a material which has a lower density than the skin, the tensile and compressive strengths of the skin and the shear strength of the material of lower density being sufficiently high for the bulkhead or cross-member to withstand tensile, compressive or shear forces to which it is subjected in use.

16. A boom as claimed in claim 14, wherein the boom or each bulkhead or cross-member comprises an outer skin over a material which has a lower density than the skin, the tensile and compressive strengths of the skin and the shear strength of the material of lower density being sufficiently high for the bulkhead or cross-member to withstand tensile, compressive or shear forces to which it is subjected in use.

17. A boom as claimed in claim 1, wherein the or each member is elongate and is tapered in a direction lengthwise of the boom.

18. A boom as claimed in claim 1, comprising a plurality of boom sections, each comprising at least one of the said members, the said at least one member being elongate and an innermost section of the boom being pivotally mounted on a supporting structure and each of the remaining sections being pivotally mounted at one end thereof on an adjacent section.

19. A boom as claimed in claim 1, wherein a plurality of spray nozzles are fitted to an underside of the boom.

20. A boom as claimed in claim 3, wherein the member is hollow and has a side wall which is formed of the said outer skin, an inner skin, and a core of the said material sandwiched between the inner and outer skins, and homogeneous material is provided along a lower part of the side wall for strengthening purposes.

21. A boom as claimed in claim 20, wherein the inner and outer skins are formed of fibre reinforced plastics material and the said homogeneous material is a metal.

* * * * *